United States Patent
Meissner et al.

(10) Patent No.: US 10,147,913 B2
(45) Date of Patent: Dec. 4, 2018

(54) RECYCLING OF PRODUCTS

(71) Applicant: Johnson Controls Autobatterie GmbH & Co. KGaA, Hannover (DE)

(72) Inventors: Eberhard Meissner, Wunstorf (DE); Anne-Laure Ledoux, Langenhagen (DE); Jurgen Bauer, Hildesheim (DE)

(73) Assignee: Johnson Controls Autobatterie GmbH & Co. KGaA, Hannover (DE)

( * ) Notice: Subject to any disclaimer, the term of this patent is extended or adjusted under 35 U.S.C. 154(b) by 991 days.

(21) Appl. No.: 14/352,215

(22) PCT Filed: Oct. 16, 2012

(86) PCT No.: PCT/EP2012/070457
§ 371 (c)(1),
(2) Date: Jun. 11, 2014

(87) PCT Pub. No.: WO2013/057087
PCT Pub. Date: Apr. 25, 2013

(65) Prior Publication Data
US 2015/0050548 A1    Feb. 19, 2015

(30) Foreign Application Priority Data
Oct. 17, 2011   (DE) .......... 10 2011 116 046

(51) Int. Cl.
*B03B 7/00* (2006.01)
*B07C 5/34* (2006.01)
(Continued)

(52) U.S. Cl.
CPC ............ *H01M 2/0257* (2013.01); *B03B 7/00* (2013.01); *B07C 5/34* (2013.01); *B07C 5/342* (2013.01);
(Continued)

(58) Field of Classification Search
CPC .. B03B 7/00; B07C 5/34; B07C 5/342; B07C 5/344; B09B 2220/00; B09B 5/00;
(Continued)

(56) References Cited

U.S. PATENT DOCUMENTS 3,985,650 A * 10/1976 Saitoh ................ B03D 1/02
209/166
5,240,789 A * 8/1993 Breen ................ G09F 3/02
40/626
(Continued)

FOREIGN PATENT DOCUMENTS

DE    4024130    2/1992
DE    4321612    1/1995
(Continued)

OTHER PUBLICATIONS

Zhang, W.-M. et al. "Carbon Coated Fe_3O_4 Nanospindles as a Superior Anode Material for Lithium-Ion Batteries", vol. 18, pp. 3941-3946, published Nov. 13, 2008. (Year: 2008).*
(Continued)

*Primary Examiner* — Sarah A. Slifka
*Assistant Examiner* — Lilia Nedialkova
(74) *Attorney, Agent, or Firm* — Fletcher Yoder P.C.

(57) ABSTRACT

The invention relates to a process for the production of a recyclable product (1, 8, 9) made from a first material, wherein before or during the production of the product (1, 8, 9) a first marking material is added to the first material and the product (1, 8, 9) is produced from the first material with the admixed marking material, wherein the first marking material can be automatically detected in a recycling plant in the first material of the product (1, 8, 9) after the production thereof. The invention also relates to a process for the recycling of a product (1, 8, 9), wherein the product (1, 8, 9) is manufactured from a first material, to which a first
(Continued)

Figure 1:
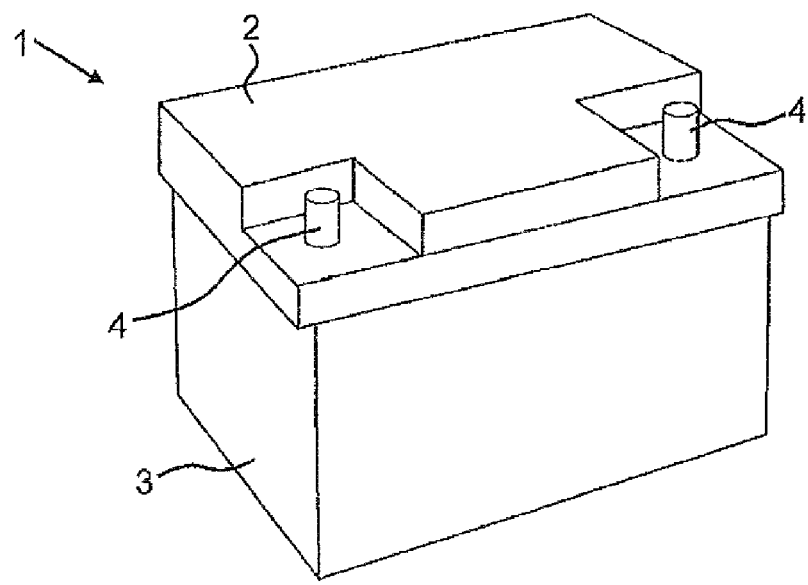

marking material is added, wherein the product (1, 8, 9) or pieces (22) of the product (1, 8, 9) are separated from one another and/or from other objects in a recycling plant, in that the first marking material is detected in the first material of the product (1, 8, 9) or the pieces (22) of the product (1, 8, 9), and the product (1, 8, 9) or the pieces (22) of the product (1, 8, 9) are separated from one another and/or other objects, in which no marking material or a different, second marking material is detected. The invention also relates to a recyclable product and a recycling plant.

18 Claims, 2 Drawing Sheets

(51) Int. Cl.
| | |
|---|---|
| *B07C 5/342* | (2006.01) |
| *B07C 5/344* | (2006.01) |
| *B09B 5/00* | (2006.01) |
| *B29B 17/02* | (2006.01) |
| *H01M 10/54* | (2006.01) |
| *H01M 2/02* | (2006.01) |
| *H01M 6/52* | (2006.01) |
| *B29L 31/34* | (2006.01) |
| *B29B 17/04* | (2006.01) |

(52) U.S. Cl.
CPC ............... *B07C 5/344* (2013.01); *B09B 5/00* (2013.01); *B29B 17/02* (2013.01); *H01M 6/52* (2013.01); *H01M 10/54* (2013.01); *B09B 2220/00* (2013.01); *B29B 17/0412* (2013.01); *B29B 2017/0279* (2013.01); *B29L 2031/3468* (2013.01); *Y02W 30/622* (2015.05); *Y02W 30/625* (2015.05); *Y02W 30/84* (2015.05); *Y10T 29/49108* (2015.01); *Y10T 29/49755* (2015.01)

(58) Field of Classification Search
CPC ............... B29B 17/02; B29B 17/0412; B29B 2017/0279; B29L 2031/3468; H01M 10/54; H01M 2/0257; H01M 6/52; Y02W 30/622; Y02W 30/625; Y02W 30/84; Y10T 29/49108; Y10T 29/49755
See application file for complete search history.

(56) References Cited

U.S. PATENT DOCUMENTS

| | | | | |
|---|---|---|---|---|
| 5,246,798 | A | * | 9/1993 | Yaacoub ............. H01M 2/1653 429/249 |
| 5,272,216 | A | | 12/1993 | Clark, Jr. et al. |
| 5,378,555 | A | * | 1/1995 | Waters ..................... B60K 1/04 180/68.5 |
| 5,397,819 | A | * | 3/1995 | Krutak .................... B07C 5/342 209/3.3 |
| 5,444,378 | A | | 8/1995 | Rogers |
| 5,989,750 | A | * | 11/1999 | Ohba .................. H01M 2/1606 264/331.11 |
| 6,850,034 | B2 | * | 2/2005 | Seils .................. G01R 31/3606 320/104 |
| 7,055,691 | B2 | * | 6/2006 | Safian .................. B65D 51/245 206/459.1 |
| 2003/0180484 | A1 | * | 9/2003 | Imai ..................... C10M 111/04 428/34.1 |
| 2004/0035756 | A1 | * | 2/2004 | Mankosa ................ B29B 17/02 209/8 |
| 2005/0277710 | A1 | | 12/2005 | Joyce et al. |
| 2007/0069153 | A1 | | 3/2007 | Pai-Paranjape et al. |
| 2008/0220329 | A1 | * | 9/2008 | Kojima ................... C04B 35/83 429/188 |
| 2010/0116517 | A1 | * | 5/2010 | Katzenberger ............ B25F 5/00 173/20 |
| 2010/0203366 | A1 | * | 8/2010 | Sloop .................... H01M 4/485 429/49 |
| 2014/0141300 | A1 | * | 5/2014 | Ronning ............. H01M 2/1077 429/83 |

FOREIGN PATENT DOCUMENTS

| | | |
|---|---|---|
| DE | 4401207 | 7/1995 |
| DE | 19530449 | 2/1997 |
| DE | 10039472 A1 | 2/2002 |
| DE | 102005020816 | 8/2006 |
| DE | 10-2007-007506 A1 | 8/2008 |
| EP | 1801148 | 6/2007 |
| FR | 2133541 | 12/1972 |
| GB | 2234347 | 1/1991 |
| GB | 2245781 A | 1/1992 |
| JP | 2003311250 | 11/2003 |

OTHER PUBLICATIONS

First Office Action issued for German Patent Application No. 102011116046.2 dated Oct. 10, 2014.

* cited by examiner

RECYCLING OF PRODUCTS

The invention relates to a process for the production of a recyclable product according to Claim 1. The invention further relates to a process for recycling a product according to Claim 2, as well as a recyclable product according to Claim 9, and a recycling system according to Claim 11.

In general, the invention relates to the recycling of products. Herein, the term "recycling" describes a process by which the raw materials contained in a product are made accessible to reuse. Herein, usually all types of waste materials containing reusable raw materials are selected by the corresponding raw materials or their materials, so that materials are available that are as pure as possible and easily reusable. In the meaning of this patent application, the term "recycling" is, however, not limited to the reuse of the materials; instead, it also includes all other types of the materials' recycling; in particular also, energy recycling, such as by means of incineration.

Different methods for separating the products arriving in a recycling plant, or respectively, of pieces of such products are known. So, for example, a so-called flotation system is known in which materials to be separated from each other are separated in a container of fluid by using their different specific gravities. Herein, lighter materials will float on top, while heavier materials will sink to the bottom. Another method for separating consists of exposing the objects to acceleration; e.g., by a circular motion, in order to thus separate lighter from heavier objects. Generally, the goal of separation is to separate the products or pieces of products by their different materials in order to be able to collect them after they have been sorted. In total, however, there is only a limited number of such separating methods, which results in the fact that for certain materials, automated separation from each other is difficult.

From WO 98/045057 or DE 103 02 853 A1, proposals are known to mark containers by means of identification objects attached to the containers after the latter have been produced and to detect these again in an eventual recycling process. The disadvantage of this is, however, that the additionally attached identification objects can become lost while the product is being used. Also, these are additional objects that physically change the product, so that this proposal cannot be used for all products.

The problem of the invention is therefore to point out improved options for separating a product or pieces of the product from each other and/or from other objects in a recycling plant.

To solve this problem, the invention takes into account the entire recycling process, starting with the production of the product, and optimizes the recycling process in several regards. For it was found that a mere optimization in the final stages of the recycling process, i.e., during the actual separation process, can be further improved if the eventual recycling process is already taken into account during the production phase of a recyclable product.

Thus, according to Claim 1, a process for manufacturing a recyclable product from a first material is proposed in which before or during the production of the product, a first marking material is admixed to the first material; and the product, or at least a component of the product, is manufactured using the first material with the admixed first marking material, whereby the first marking material in the first material is, after the latter's production, automatically detectable in a recycling plant. Such marking of the product or of at least a component of the product with the first marking material has the advantage—as compared to the known proposals for marking products in the recycling sector—that the marking cannot get lost over the product's lifecycle, and that it cannot be damaged either. By directly admixing the first marking material to the first material, the first marking material also becomes a material part of the product that can no longer become lost.

According to an advantageous further embodiment, a product or a component of the product can be manufactured from a second material that is to be separated from the first material in a recycling plant by admixing—before or during the production of the product—a different, second marking material to the second material and by manufacturing the product from the first material and the admixed second marking material, whereby the second marking material is automatically detectable, at a recycling plant, in the second material after the latter's production.

What is to be understood here by 'a material of a product' or 'a component of the product' shall be both a material consisting of only one raw material as well as a material consisting of a mixture of two or more raw materials. What is to be understood here by 'a component of a product' shall be—for products manufactured of several individual parts (components)—its individual parts. With regard to the product 'rechargeable battery', as shown in FIG. 1, the housing with a housing bottom and a housing lid, as well as the connecting posts, the electrode plates, and the separators are components of the 'rechargeable battery' product.

The marking material can be admixed to the material of the product or of the product component directly during the production of the product—such as, in the case of a plastic material, during the injection molding process of a housing component. The admixture can also take place before the product is manufactured—e.g., by a first material being supplied with an already admixed first marking material. In the case of the manufacture of plastic products, e.g., the first marking material can already have been admixed with the plastic granules delivered.

According to Claim 2, a process for recycling a product is proposed whereby the product or at least a component of the product has been manufactured from a first material to which a first marking material has been admixed, whereby the product, a component of the product or pieces of the product are separated from other objects and/or pieces of the product are separated from each other by the first marking material being detected in the first material and the product, a component of the product or pieces of the product being separated from other objects and/or pieces of the product in which a marking material or a different second marking material is not detected.

This has the advantage that the product and/or also each individual component and each individual piece of the product can be detected at the recycling plant and separated from other objects or pieces of products in a simple manner by the first marking material being detected. The process can be used advantageously in any type of recycling plant, in particular also in recycling plants in which products to be recycled are first broken down into small pieces using a crusher. Due to the direct admixture of the first marking material to the first material of the product, this can then continue to be identified also in the individual pieces of the product, which up until now has not been possible in processes according to the state of the art.

According to an advantageous further embodiment of the invention it is thus provided for the product or at least a component of the product to be broken into pieces before the detection of the first and/or the second marking material, and that the separation process is performed on the pieces of the product.

According to an advantageous further embodiment, the first and/or the second marking material is completely distributed throughout the first material of the product or at least a component of the product. Here, the first marking material can be distributed evenly or unevenly. Even distribution is overall more advantageous for eventual recycling, but minor unevennesses are not detrimental.

Generally, the first material may be any material, in particular, an organic or inorganic material. According to an advantageous further embodiment of the invention, the first material is a polymer material, in particular, polypropylene, polyethylene, a mix of these, or a co-polymer of polyethylene and polypropylene.

According to an advantageous further embodiment of the invention, the first and/or the second marking material is a material detectable by means of an optical sensor, an electromagnetic or a magnetic sensor. The optical sensor may be, e.g., a camera; the magnetic sensor may be, e.g., a Reed switch or a magnetic field probe. As an electromagnetic sensor, e.g., an electric coil can be used.

The first and/or the second marking material can, e.g., be a material with a specific color that is characteristic and unique and that does not, in particular, exist in other, similar products made of a different material. In this case, the first and/or the second marking material have colored pigment substances. The first and/or the second marking material can be a colorant or a mixture of colorants. This allows, e.g., detecting the first and/or the second marking material by means of an optical sensor.

The first and/or the second marking material can also be a magnetic material, e.g., magnetite powder or iron filings. This allows detection by means of a magnetic sensor.

The first and/or the second marking material can also have a material that changes an electromagnetic field. So for example, microcoils can be admixed to the first material as a first marking material, e.g., microcoils made of carbon. Here, electrical coils with dimensions within a few μm are called microcoils. These cause increased absorption of high-frequency electromagnetic radiation that the product is exposed to. Such absorption of electromagnetic fields can, e.g., be detected by means of an electromagnetic sensor.

Generally speaking, the first and/or the second marking material can be a material that is detectable without external stimulation. The first and/or the second marking material can also be a material that must first be externally stimulated in order to be detectable. According to an advantageous further embodiment of the invention, the first and/or the second marking material is a material that responds to an alternating electromagnetic field or to a magnetic field. Herein, material can be used that responds differently to an alternating electromagnetic field in different frequency ranges, with all materials that respond in different frequency ranges generally being usable. The alternating electromagnetic fields in this meaning also include light, both in the visible range and in the range invisible to humans. The visible range of light is considered to lie between the wavelengths of 380 and 780 nanometers (nm). Electromagnetic radiation in the non-visible range includes, e.g., infrared radiation or ultraviolet radiation, both of which are frequently also described as light.

The first and/or the second marking material can, in particular, be a material that responds with a change in color to light in the invisible wave frequency range, a magnetic, a fluorescent or a phosphorescent material or a photoluminescent material. The first and/or the second marking material can, e.g., be fluorescein, a fluorophore (NIFRS) that fluoresces in the near-infrared range or Storelite, or—in the case of a phosphorescent material—a sulfite of metals from the second group as well as zinc, to which materials with small quantities of heavy metal salts have been added, such as copper-doped zinc sulfite pigments, or a mixed CAS/SRS sulfite doped with bismuth.

According to an advantageous further embodiment of the invention, the first material is identified in the product, in a component of the product or pieces of the product by detecting the first marking material within the first material, and the first material is identified based on a defined assignment between the first material and the first marking material. Herein, the first material can be identified, e.g., with regard to the type of material, e.g., whether it is a plastic material, wherein it is also possible to distinguish between different types of plastics. Herein, the defined assignment between the first material and the first marking material can be provided to a recycling plant by the manufacturer of the recyclable product.

The invention further relates to a recyclable product that has been manufactured according to one of the processes described above. In particular, the product can be a housing of a rechargeable battery or an entire rechargeable battery, e.g., in the shape of a starter battery for motor vehicles.

The invention further relates to a recycling plant configured to perform a process described above.

The invention is explained in more detail below, based on exemplary embodiments and using the drawings.

It is shown below in:

FIG. 1 a rechargeable battery in an isometric view, and

Figure 2:
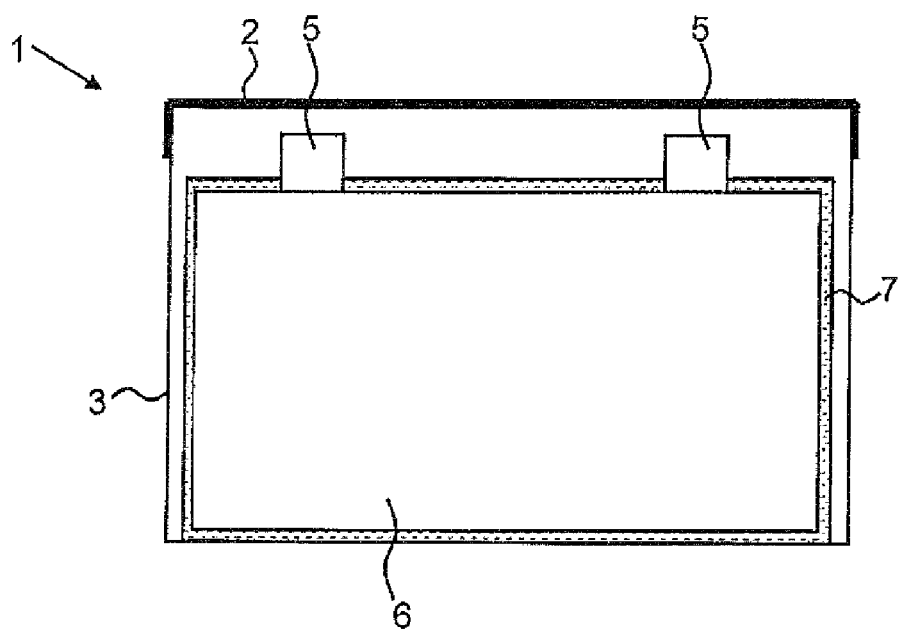

FIG. 2 the rechargeable battery as per FIG. 1 in a sectional view, and

Figure 3:
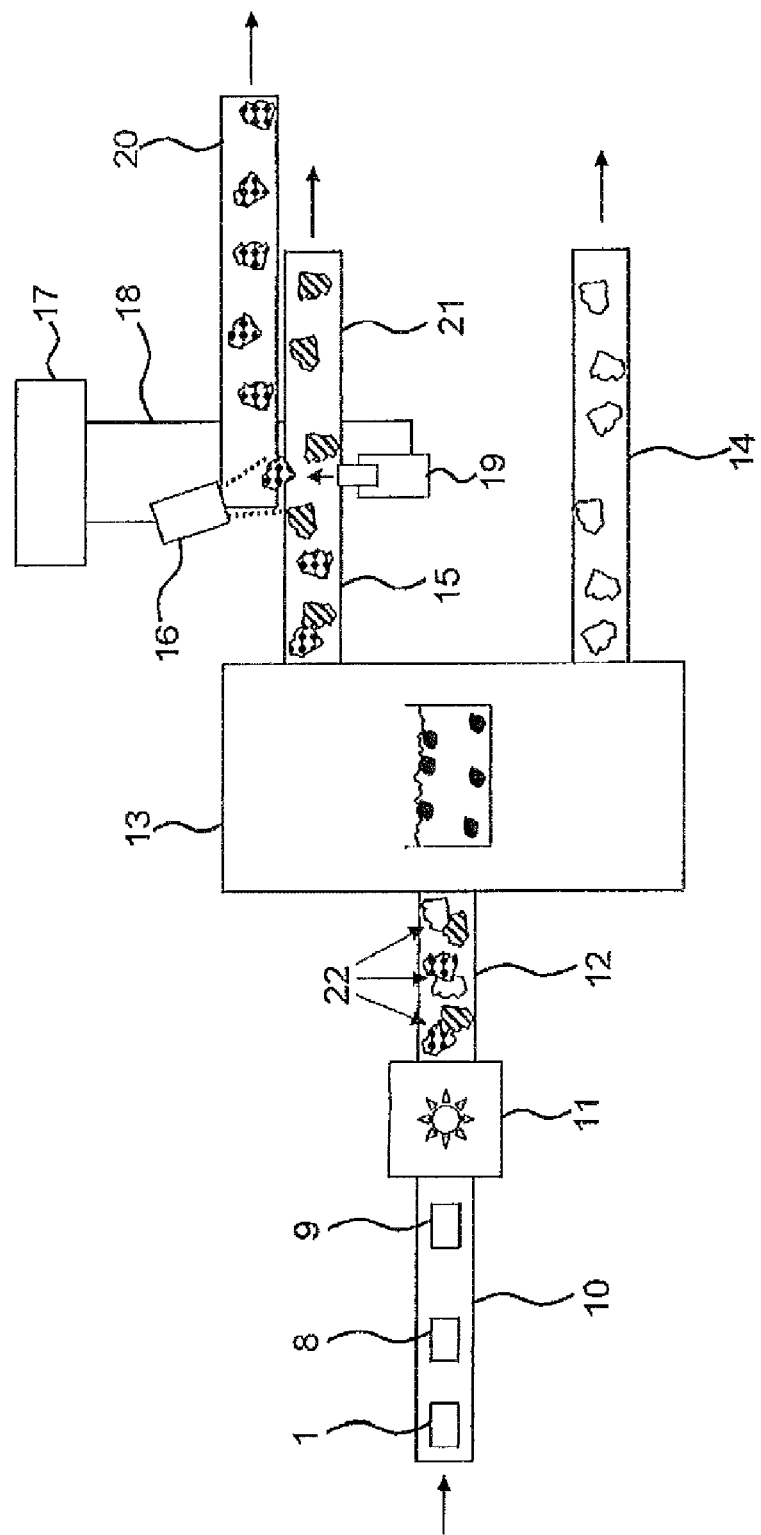

FIG. 3 a recycling plant.

The Figures use the same reference symbols for identical elements.

FIG. 1 shows a rechargeable battery 1, e.g. in the shape of a starter battery, in an isometric view. Herein, rechargeable battery 1 is shown in a simplified manner. What can be seen is a housing with a housing bottom 3 and a housing lid 2, which sits on housing bottom 3 and seals the latter. Through openings in housing lid 2, terminal posts 4 are routed to the outside of rechargeable battery 1, which posts are used to provide the electrical contact with rechargeable battery 1.

FIG. 2 shows rechargeable battery 1 in a sectional view through a cell of rechargeable battery 1. What can be seen is the typical design of a starter battery, in the interior of a cell of which battery electrode plates 6 are provided that are connected to terminal posts 4 by means of a connecting tab 5 each. Herein, some electrode plates 6 can be arranged within pocket-shaped separators 7, e.g., all of the positive [+] electrode plates. Herein, separators 7 protrude somewhat in height above electrode plates 6.

When recycling such a rechargeable battery 1, housing components 2, 3 that are manufactured from, e.g., polypropylene, must be separated from electrode plates 6 and separators 7 and, if applicable, from other components made of other materials. Herein, housing components 2, 3 may consist of unfilled polypropylene or of filled polypropylene, wherein for such a filling, e.g., talcum powder is admixed to the polypropylene. Unfilled polypropylene can, without any difficulty, be separated from the other substances—in particular, from filled polypropylene—by means of known separation processes, such as flotation. In the case of housing components made of filled polypropylene, during flotation there is, e.g., the effect that the filled polypropylene pieces cannot be separated from the separator pieces because both of these ingredients sink to the bottom of the flotation system.

Based on FIG. 3, which shows a recycling plant, a process for recycling products 1, 8, 9, e.g., rechargeable batteries of the type explained by means of FIGS. 1 and 2, is to be described simultaneously. The recycling plant according to FIG. 3 has a feed conveyor belt 10, on which three products 1, 8, 9 are moved to the recycling process. Product 1, e.g., is a rechargeable battery having housing components made of unfilled polypropylene, Product 8 and Product 9 are each rechargeable batteries having housing components made of filled polypropylene. Inside of all of these rechargeable batteries 1, 8, 9 are separators 7.

Products 1, 8, 9 are fed to a crusher 11 by means of feed conveyor 10. In crusher 11, Products 1, 8, 9 are broken down into small pieces 22. These pieces 22 are transported from crusher 11 to a flotation system 13 via a second conveyor belt 12. Pieces 22 of products 1, 8, 9, which pieces can be seen on second conveyor belt 12 as well as on the other conveyor belts yet to be described, shall be defined in the following typical manner:
Pieces with striped pattern: Pieces of separators 7
Pieces with check pattern: Pieces of housing components made of filled polypropylene
Pieces without pattern: Pieces of housing components made of unfilled polypropylene.

In this case it shall be assumed that the filled polypropylene material is mixed with a first marking material that fluoresces when exposed to ultraviolet light.

The pieces fed will first be pre-separated in flotation system 13. Herein, the pieces made of the unfilled polypropylene material can be separated out and transported off by means of a third conveyor belt 14.

The mixed fraction of separator pieces and pieces of filled polypropylene emerging from flotation system 13 are fed to a separation device 16, 17, 18, 19 by means of a fourth conveyor belt 15. This separation device will separate the two different substances from each other based on the first marking material admixed in the filled polypropylene material.

The separation device has a sensor device 16 that can, e.g., be embodied as a digital camera. Sensor device 16 additionally has a radiation source for emitting ultraviolet light, which the pieces on conveyor belt 15 are exposed to. Sensor device 16 is connected to electrical controller 17 via a line. The electrical controller has been pre-programmed to evaluate—by means of image processing—the images that are supplied by the sensor device, showing the pieces on conveyor belt 15, and thus to detect pieces marked with the first marking material. Detection of the pieces marked with the first marking material is performed by detecting a fluorescent light effect in the images supplied by sensor device 16. When a piece marked with the first marking material—i.e., in this case, a piece with a check pattern—is detected, electronic controller 17 actuates an actuator 19 via a line 18. Actuator 19 effects a transfer of the detected piece from fourth conveyor belt 15 to a fifth conveyor belt 20. Actuator 19 can, e.g., be embodied as a blower emitting a stream of air that causes a desired piece to be blown from fourth conveyor belt 15 to fifth conveyor belt 20. Actuator 19 can, e.g., also be embodied as a pneumatic or hydraulic cylinder equipped with an extendable rod. The piece will then be pushed by this rod from fourth conveyor belt 15 to fifth conveyor belt 20.

As can be seen, the separated pieces made of filled polypropylene will be removed by fifth conveyor belt 20. The remaining separator pieces will be removed by fourth conveyor belt 15 via a conveyor belt section 21 located behind actuator 19.

The invention claimed is:

1. A process for the production of a battery, comprising:
  manufacturing a housing of the battery using a first recyclable polymeric material that includes a first marking material;
  manufacturing a plurality of separators of the battery using a second recyclable polymeric material that includes a second marking material, wherein the first and second recyclable polymeric materials are the same recyclable polymeric material, wherein one of the first or second marking materials is a photoluminescent material and the other of the first or second marking materials is a magnetic material or electric microcoils that are detectable and distinguishable from the photoluminescent material during recycling of the battery, and wherein the first and the second recyclable polymeric materials each comprise polypropylene; and
  sealing a plurality of electrode plates of the battery into an interior of the housing, wherein at least a portion of at least one of the plurality of separators is disposed between each of the plurality of electrode plates in the interior of the housing.

2. The process of claim 1, comprising admixing the first marking material to the first recyclable polymeric material and admixing the second marking material to the second recyclable polymeric material.

3. The process of claim 2, wherein admixing the first marking material to the first recyclable polymeric material comprises substantially evenly distributing the first marking material within the first recyclable polymeric material.

4. The process of claim 1, wherein the first marking material is the electric microcoils.

5. The process of claim 4, wherein the electric microcoils consist essentially of carbon and absorb high-frequency electromagnetic radiation.

6. The process of claim 5, wherein the second marking material is the photoluminescent material.

7. The process of claim 1, wherein the first and second recyclable polymeric materials comprise a co-polymer of polyethylene and polypropylene.

8. The process of claim 1, wherein the first and second recyclable polymeric materials comprise polypropylene filled with a filler material, the filled polypropylene having a higher density than unfilled polypropylene.

9. The process of claim 1, wherein the first marking material is the photoluminescent material and the second marking material is magnetite powder.

10. The process of claim 1, wherein the first marking material is the photoluminescent material and the second marking material comprises iron filings.

11. The process of claim 1, comprising manufacturing at least a third component of the battery using a third recyclable polymeric material that does not include a marking material, and wherein the third recyclable polymeric material comprises filled polypropylene and the first and second recyclable polymeric materials comprise unfilled polypropylene, or the third recyclable polymeric material comprises unfilled polypropylene and the first and second recyclable polymeric materials are filled polypropylene.

12. The process of claim 1, wherein the plurality of separators comprise a plurality of pocket-shaped separators, and wherein each positive electrode plate of the plurality of electrode plates is disposed inside each pocket-shaped separator of the plurality of separators.

13. The process of claim 12, wherein the plurality of separators protrude in height above the plurality of electrode plates within the interior of the housing of the battery.

14. The process of claim 12, wherein the battery is a starter battery for a motor vehicle.

15. A method of manufacturing a starter battery for a motor vehicle, comprising:
- admixing a photoluminescent marking material to a first polypropylene material;
- admixing a second marking material to a second polypropylene material, wherein the first polypropylene material and the second polypropylene material are the same polypropylene material and the second marking material is magnetic marking material or electric microcoils; and
- manufacturing a housing and a separator of the starter battery using the first and second polypropylene materials, wherein one of the housing and the separator is manufactured from the first polypropylene material and the other of the housing and the separator is manufactured from the second polypropylene material.

16. The method of claim 15, wherein the housing is manufactured from the first polypropylene material and the separator is manufactured from the second polypropylene material.

17. The method of claim 15, wherein the housing is manufactured from the second polypropylene material and the separator is manufactured from the first polypropylene material.

18. The method of claim 15, wherein the first polypropylene material and the second polypropylene material comprise a polyethylene co-polymer.

* * * * *